Patented July 26, 1932

1,868,602

UNITED STATES PATENT OFFICE

GERHARD HECHT, OF WUPPERTAL-ELBERFELD, ANTON OSSENBECK, OF COLOGNE-MULHEIM, AND ERNST TIETZE, OF COLOGNE, GERMANY, ASSIGNORS TO WINTHROP CHEMICAL COMPANY, INC., OF NEW YORK, N. Y., A CORPORATION OF NEW YORK

CONTRAST MEDIA FOR X-RAY PHOTOGRAPHY

No Drawing. Application filed December 31, 1931, Serial No. 584,272, and in Germany July 8, 1930.

The present invention relates to new contrast media for X-ray photography.

It is known that compounds containing iodine are in some cases proved to be suitable for use as contrast agents, which are of importance in the X-ray photography of organs, particularly also of the urinary passages. However, the contrast agents employed up to date in the medicinal practice require the use of relatively great volumes of the solution of the contrast agent owing to an insufficient iodine content of the agents used. Therefore, efforts are being made for raising the iodine concentration to obtain a deepening of the X-ray shadow.

In accordance with the present invention water-soluble salts of diiodo-methane-sulfonic acids of the probable general formula:

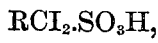
$$RCI_2.SO_3H,$$

wherein R stands for hydrogen or an alkyl group, are to be used as contrast agents in order to produce an X-ray shadow in the organs filled up with these media. The water-soluble salts of the diiodo-methane-sulfonic acid and its homologues are distinguished by a very high iodine content and by a good solubility in water.

The new contrast media may be introduced into the hollow systems of the organisms which are to be rendered visible by the X-rays variously. We prefer to use the aqueous solutions of the water-soluble salts of the diiodo-methane-sulfonic acid and their homologues intravaneously.

Another method for introducing the new contrast agents into the organs to be rendered visible is, for example, the introduction by means of the catheterization of the ureter. Sometimes it is also possible to employ the contrast agents per os. We prefer to use the alkali metal salts of the diiodo-methane sulfonic acid or its homologues, such as methyl- ethyl- propyl- and isopropyl-diiodo-methane sulfonic acid. Also some amine salts are of particular value for the use of the said acids as contrast agents, for example, the diethylamine salts, the diethylaminoethanol and ethylenediamine salts, which are likewise readily soluble in water.

The salts of diiodo-methane-sulfonic acid and alkyl substitution products thereof, are prepared by reacting upon an alpha-halogen acetic acid or an alkyl substitution product thereof with a neutral sulfite and iodizing the sulfo-acetic acid or the alkyl substitution product thereof obtained at a high temperature by means of iodine. Thereby carbon dioxide is split off and two iodine atoms are attached to the carbon atom substituted by the sulfonic acid group. The preparation of the diiodomethane sulfonic acid according to the above directions has been described by Backer, Receuil des Travaux Chimiques des Pays Bas, 45, page 833.

The invention is further illustrated by the following examples without being restricted thereto:

Example 1

A 20% solution of lithium-diiodo-methane sulfonate is injected by means of catheterization of the ureter into the pelvis of the kidneys. A few minutes later the X-ray photograph is taken in the usual manner.

Example 2

5 grams of sodium-diiodo-methane sulfonate are dissolved in 10–20 ccs. of water. The solution is injected intravaneously. Within 15–30 minutes in the case of disorders of the kidney function also still later an X-ray photograph of the urinary passages may be taken in the usual manner.

Example 3

Into a blood vessel a suitable quantity of an aqueous 20–40% solution of sodium-methyl-diiodo-methane sulfonate is injected in accordance with the technique customary in vasography. When taking thereafter an X-ray photograph the vessel parts being in question are rendered visible.

*Example 4*

Fistulæ are filled up with a suitable quantity of a 20% aqueous solution of sodium-diiodo-methane sulfonate. On an X-ray photograph the position and extension of the canal of the fistulæ is rendered visible.

*Example 5*

A joint cavity is filled up with an about 20% aqueous solution of diethylamine-di-iodomethane-sulfonate and an X-ray photograph is taken in the customary manner.

*Example 6*

A maxillary sinus is rendered visible for X-ray photography by injecting a suitable quantity of an about 20% aqueous solution of diiodo-ethane sulfonic acid sodium.

*Example 7*

By means of spinal puncture 10–20 ccs. of a 10–20% aqueous solution of sodium-diiodomethane sulfonate are injected into the spinal canal. Then a myelography is produced according to the customary technique.

We claim:—

1. Contrast medium for X-ray photography, containing a water-soluble salt of an acid of the probable formula:

$$R-CI_2-SO_3H,$$

wherein R stands for hydrogen or an alkyl group.

2. Contrast medium for X-ray photography, containing an alkali metal salt of an acid of the probable formula:

$$R-CI_2-SO_3H,$$

wherein R stands for hydrogen or an alkyl group.

3. Contrast medium for X-ray photography, containing a water-soluble salt of diiodo-methane sulfonic acid.

4. Contrast medium for X-ray photography, containing an alkali metal salt of diiodo-methane sulfonic acid.

5. Contrast medium for X-ray photography, containing sodium-diiodo-methane sulfonate.

6. Contrast medium for X-ray photography, containing an amine salt of an acid of the probable formula:

$$R-CI_2-SO_3H,$$

wherein R stands for hydrogen or an alkyl group.

7. Contrast medium for X-ray photography, containing an amine salt of diiodomethane sulfonic acid.

8. Contrast medium for X-ray photography, containing a diethylamine salt of an acid of the probable formula:

$$R-CI_2-SO_3H,$$

wherein R stands for hydrogen or an alkyl group.

9. Contrast medium for X-ray photography, containing the diethylamine salt of diiodo-methane sulfonic acid.

In testimony whereof, we affix our signatures.

GERHARD HECHT.
ANTON OSSENBECK.
ERNST TIETZE.